July 26, 1960
L. J. POPE
2,946,866
TIRE PRESSURE INDICATING DEVICE
Filed Jan. 25, 1957
2 Sheets-Sheet 1
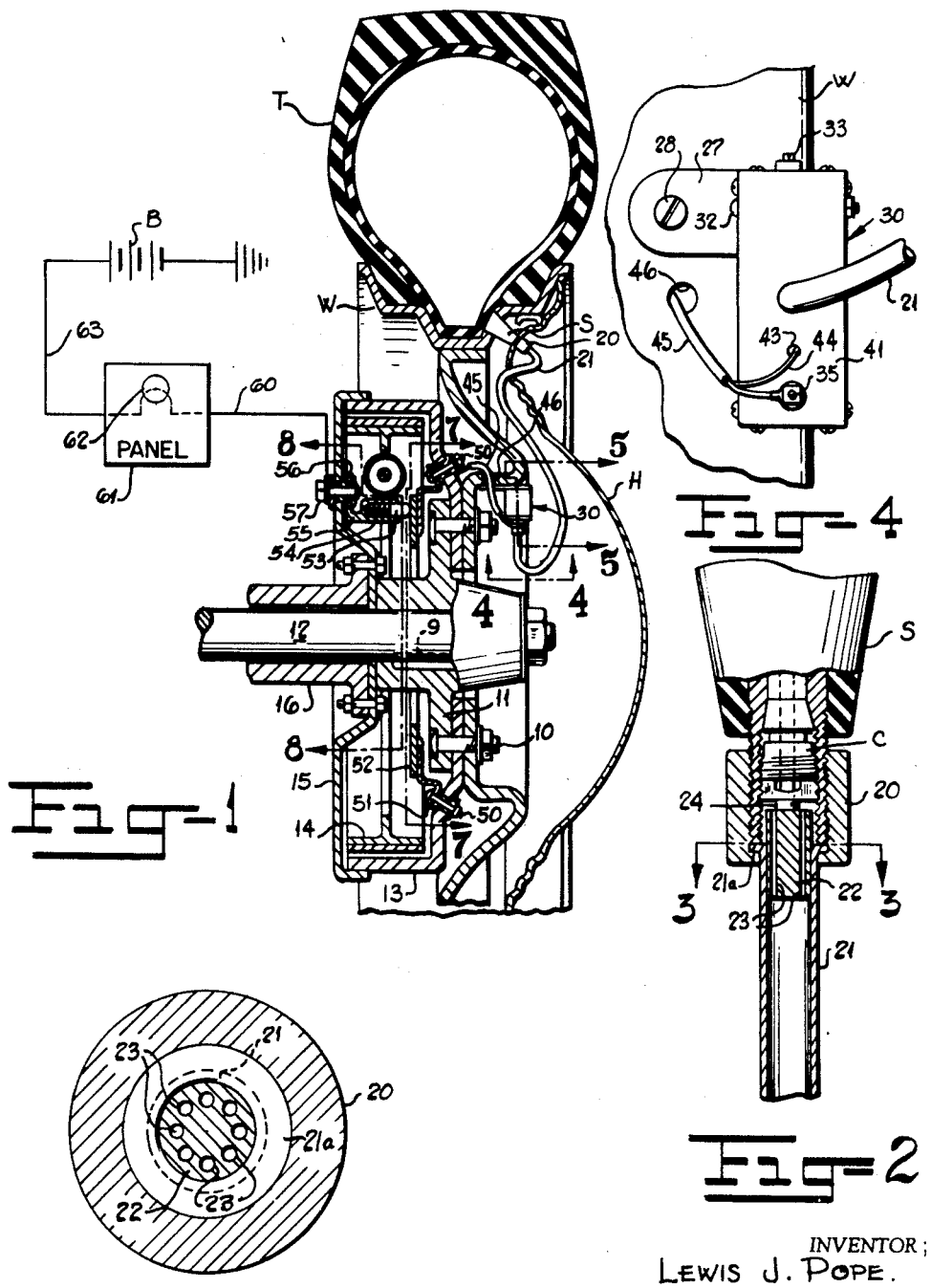
INVENTOR;
LEWIS J. POPE.
BY Eaton, Bell, Hunt + Seltzer
ATTORNEYS July 26, 1960 L. J. POPE 2,946,866
TIRE PRESSURE INDICATING DEVICE
Filed Jan. 25, 1957 2 Sheets-Sheet 2
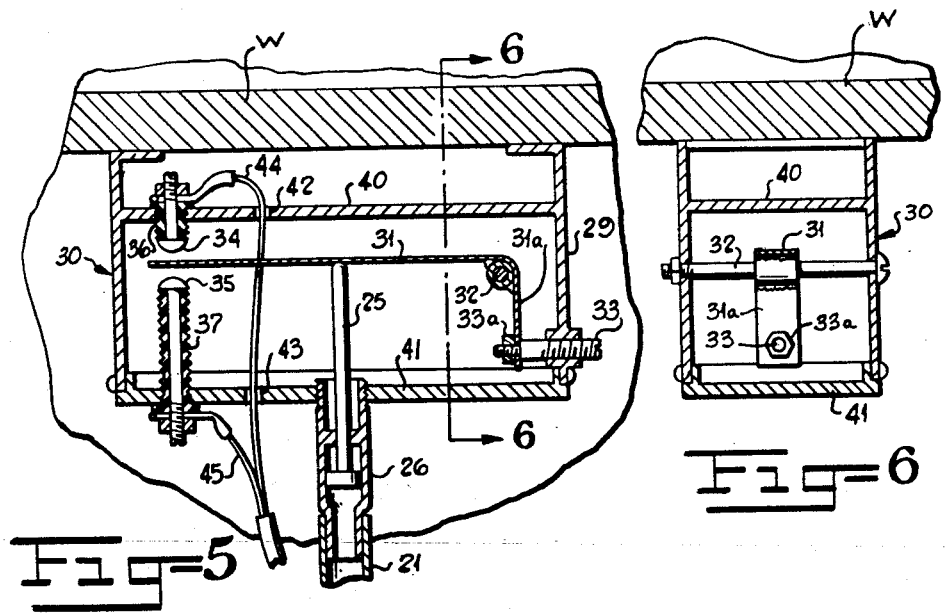
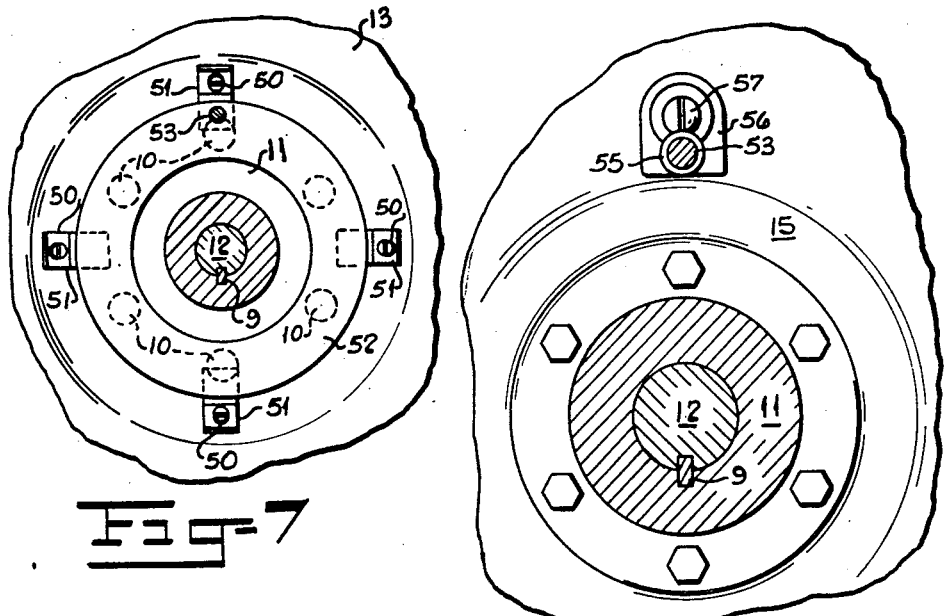
INVENTOR;
Lewis J. Pope.
BY Eaton, Bell, Hunt + Seltzer
ATTORNEYS

United States Patent Office 2,946,866
Patented July 26, 1960

2,946,866

TIRE PRESSURE INDICATING DEVICE

Lewis J. Pope, 1901 Kenilworth Ave., Charlotte, N.C.

Filed Jan. 25, 1957, Ser. No. 636,423

2 Claims. (Cl. 200—61.25)

This invention relates to indicators and more particularly to a device for indicating when the air pressure in a pneumatic tire of an automobile or other vehicle is below or above the desired value.

It is an object of the invention to provide a tire pressure indicating device whereby the air pressure in the tire is permitted to flow through a tubular passageway to actuate an electrical switch which is connected to a warning device positioned in the vehicle to be readily observed by the driver for indicating when the pressure in the tires is above or below the desired value.

It is more particularly an object of the invention to provide an indicating device for indicating the pressure in the tires of a vehicle wherein the device is so constructed and positioned that there is very little likelihood of the wheel being thrown out of balance by the device being mounted thereon.

It is a further object of the invention to provide a tire pressure indicating device which is so constructed that the same may be mounted on the wheel of any type of vehicle without re-arranging the parts thereon and which is positioned to be substantially hidden behind the wheel cover so as not to detract from the appearance of the vehicle.

It is a more specific object of the invention to provide a tire pressure indicating device which has a high and low switch mounted close to the axle of the vehicle which switches are controlled by a piston, the position of which is determined by the air pressure in the tire acting upon the same.

Some of the objects of the invention having been stated, other objects will appear as the description proceeds when taken in connection with the accompanying drawings, in which—

Figure 1 is a vertical sectional view of the pressure indicating device applied to the wheel of a vehicle with portions broken away for clarity and portions of the electrical circuit shown schematically;

Figure 2 is an enlarged fragmentary view partially in section of the valve stem and means connected thereto for maintaining the valve core in depressed relation to permit the air pressure in the tire to pass therethrough;

Figure 3 is an enlarged horizontal cross-sectional view taken along line 3—3 of Figure 2;

Figure 4 is an enlarged bottom plan view taken along line 4—4 of Figure 1;

Figure 5 is an enlarged vertical sectional view taken along line 5—5 of Figure 1;

Figure 6 is a vertical sectional view taken along line 6—6 of Figure 5;

Figure 7 is a vertical sectional view taken along line 7—7 of Figure 1 and showing the manner in which the annular ring is mounted for being contacted by the brush;

Figure 8 is an enlarged vertical sectional view taken along line 8—8 of Figure 1 and showing the manner in which the brush is positioned on the annular brake shoe supporting plate.

Referring more specifically to the drawings, particularly Figure 1, T indicates a pneumatic tire having a valve stem S and a valve core C therein. The tire T is suitably mounted on a conventional wheel W provided with a wheel cover H. The wheel W is secured by conventional lug bolts 10 to an annular wheel supporting plate 11 which is secured by a key 9 to an axle 12 and mounted for rotation therewith. The lug bolts 10 also secure a conventional brake drum 13 to the annular wheel supporting member 11. The brake drum 13 encloses conventional brake shoes 14 which are mounted on an annular brake shoe supporting plate 15 which is suitably connected to a stationarily mounted axle housing 16.

Referring now to Figure 2, the valve stem S is provided with a valve cap 20 threadably secured to its outer end. The valve cap is provided with an aperture or opening in its outer end in which is positioned a tube or air passageway 21 having a flared end portion 21a to form a tight seal with the outer end of the valve stem S. Formed integral with or suitably secured in the tube 21 adjacent its flared end 21a and extending beyond the flared end 21a is a plug member 22 adapted to engage a valve core plunger 24 to maintain the same depressed to permit the air in the tire T to flow into the tube 21 through longitudinal openings 23 circularly arranged in the plug member 22 as most clearly shown in Figure 3.

The other end of the tube 21 as shown in Figures 1 and 5 is suitably connected to a coupling 26 in which is slidably mounted a piston or plunger member 25 which serves to control the actuation of the switch broadly indicated by reference number 30. The switch 30 is provided with a lug or ear portion 27 (Figure 4) which is penetrated by a screw or bolt 28 to secure the switch to the wheel W. The switch 30 is provided with a housing 29 containing an inherently downwardly biased leaf spring contact 31 which is pivotally connected at 32 to the side walls of the housing. The leaf spring contact 31 has a downwardly depending rear end portion 31a preferably formed integral therewith which is penetrated by an adjustment screw 33 which is secured thereto by a nut 33a. The adjustment screw 33 is threadably mounted in one wall of the housing 29 and serves to position the leaf spring contact 31 in the desired intermediate position between opposed or upper and lower contacts 34, 35, respectively.

The pivotal connection 32 and the adjustment screw 33 each also serve to ground the leaf spring contact 31 to the switch housing 29 which is suitably grounded to the frame of the vehicle to complete the electrical circuit to be explained in detail later.

It is apparent upon observing Figure 5 that the contact 31 will only engage the upper contact 34 in the event that the pressure in the tire T is of such a high value that the pressure moves the piston 25 upwardly to move the contact 31 against the contact 34. Conversely, it is apparent that the lower contact 35 will be engaged by the contact 31 in the event that the pressure in the tire T is of an insufficient amount to maintain the piston 25 ejected sufficiently to hold the contact 31 out of engagement with the contact 35.

The contacts 34 and 35 are suitably insulated from upper and lower walls 40 and 41 of the switch housing 29 by insulating sleeves 36 and 37, respectively. Connected to the outermost ends of the contacts 34, 35 are lead conductors 44, 45 respectively with the conductor 44 preferably being spliced to the conductor 45 since only one wire is required to complete the remainder of the circuit to each wheel since the car frame itself serves as the ground. It will be observed in Figure 5 that small openings 42, 43 are provided in the housing walls 40 and 41 to permit the conductor 44 to be joined with the conductor 45 in as short a distance as is feasible.

The conductor 45 has its inner end suitably connected to one of a plurality of bolts 50 which penetrate the brake drum 13 and are suitably insulated therefrom. As seen in Figure 7, the bolts 50 primarily serve to support an annular copper band or ring 52 by engaging lugs or ears 51 extending outwardly from the outer surface thereof. The annular ring 52 is thus supported to surround the shaft 12 and the hub portion of the annular plate 11 thereon in concentric relationship.

A stationary brush 53 is adapted to engage the annular ring 52 at all times. The brush 53 is urged outwardly under tension to engage the ring 52 by a spring 54 positioned in a brush housing 55. The housing 55 is provided with an upwardly turned inner end or lug portion 56 which is penetrated by a bolt 57 to secure the same to the brake shoe supporting plate 15. As will be observed in Figure 1, the bolt 57 is suitably insulated from the brake supporting plate 15 and the outer end of the bolt 57 has a conductor 60 suitably connected thereto which leads to a panel 61 positioned in the driver's compartment of the vehicle to be readily observed by the driver. The panel 61 is provided with a suitable light or warning device 62 thereon to permit the driver to readily observe the condition of the tire pressure at all times. The warning device 62 in the panel 61 is suitably connected to a conductor 63 leading to a battery B which is suitably grounded to the frame of the vehicle to complete the electrical circuit. Although only one warning device 62 is shown, it is apparent that a separate warning device is provided for each wheel.

It is thus seen that the electrical circuit is completed by the leaf spring contact 31 being grounded to the housing of the switch 30 which is grounded to the frame of the vehicle and upon the leaf spring contact moving into engagement with one of the opposing contacts 34 or 35, the circuit is completed through the conductor 45, bolt 50, annular ring 52, brush 53, the brush housing 55, the bolt 57 and the conductors 60 and 63 to the battery B.

It is thus seen that there has been provided a tire pressure indicating device wherein the components of the same are arranged in close proximity to the axle of the vehicle to prevent very little likelihood of the wheel being thrown out of balance as is the case with so many devices of this nature. Also, it is apparent that the construction of the indicating device is relatively simple with very little likelihood of any of the parts breaking down and interrupting the operation thereof.

In the drawings and specification there has been set forth a preferred embodiment of the invention and although specific terms are employed, they are used in a generic and descriptive sense only and not for purposes of limitation, the scope of the invention being defined in the claims.

I claim:

1. A pressure responsive switch for actuating a device indicating improper pressure in a tire of a vehicle, said switch comprising a housing, a tubular passageway attached to said housing for providing communication with the interior of the tire so as to be subject to the pressure therein, means in said tubular passageway movable in response to pressure variations in said tubular passageway, said means comprising a piston slidably received in said tubular passageway, said piston extending into said housing, a pair of spaced fixed contacts extending from oppositely disposed walls of said housing, a leaf spring contact adjustably mounted for pivotable movement in said housing, means for adjusting the position of said leaf spring contact in said housing between said pair of fixed contacts in engagement with the one of the fixed contacts closest to said piston, said piston normally contacting a surface of said leaf spring contact and urging said leaf spring contact to a position in spaced relationship with respect to said pair of fixed contacts, said piston moving said leaf spring contact into engagement with the other of said fixed contacts upon an increase in pressure in the tubular passageway above a predetermined amount, and said leaf spring contact engaging said one of said fixed contacts upon a decrease in pressure in the tubular passageway below a predetermined amount which relieves the urging force of said piston against said leaf spring contact.

2. A pressure responsive switch for actuating a device indicating improper pressure in a tire of a vehicle, said switch comprising a housing, a tubular passageway attached to said housing for providing communication with the interior of the tire so as to be subject to the pressure therein, means in said tubular passageway movable in response to pressure variations in said tubular passageway, said means comprising a piston slidably received in said tubular passageway, said piston extending into said housing, a pair of spaced fixed contacts extending from oppositely disposed walls of said housing, an L-shaped movable contact in said housing, said L-shaped movable contact comprising a leaf spring having a depending leg, means mounting said movable contact for pivotable movement in said housing about the juncture between said leaf spring and its depending leg, an adjustment screw threadably received in a wall of said housing and extending therethrough, said adjustment screw being secured to said depending leg in relatively rotatable relationship with respect thereto and being manually rotatable to pivot said L-shaped movable contact about said mounting means for adjusting the position of said leaf spring in said housing between said pair of fixed contacts in engagement with the one of the fixed contacts closest to said piston, said piston normally contacting a surface of said leaf spring and urging said leaf spring to a position in spaced relationship with respect to said pair of fixed contacts, said piston moving said leaf spring into engagement with the other of said fixed contacts upon an increase in pressure in the tubular passageway above a predetermined amount, and said leaf spring engaging said one of said fixed contacts upon a decrease in pressure in the tubular passageway below a predetermined amount which relieves the urging force of said piston against said leaf spring.

References Cited in the file of this patent

UNITED STATES PATENTS

| | | |
|---|---|---|
| 643,405 | Friend | Feb. 13, 1900 |
| 2,063,871 | French | Dec. 8, 1936 |
| 2,188,112 | Hicks | Jan. 23, 1940 |
| 2,190,117 | Griffith | Feb. 13, 1940 |
| 2,205,168 | Guthrie | June 18, 1940 |
| 2,248,047 | Addy | July 8, 1941 |
| 2,475,069 | Wood | July 9, 1949 |
| 2,524,968 | Eriksen | Oct. 10, 1950 |
| 2,565,073 | Fuehring | Aug. 21, 1951 |